US010065303B1

(12) United States Patent
Engebretson

(10) Patent No.: US 10,065,303 B1
(45) Date of Patent: Sep. 4, 2018

(54) RETENTION DEVICE FOR HAND-HELD POWER TOOLS

(71) Applicant: Curt J. Engebretson, Mandan, ND (US)

(72) Inventor: Curt J. Engebretson, Mandan, ND (US)

( * ) Notice: Subject to any disclaimer, the term of this patent is extended or adjusted under 35 U.S.C. 154(b) by 0 days.

(21) Appl. No.: 15/680,583

(22) Filed: Aug. 18, 2017

(51) Int. Cl.
*F16M 1/00* (2006.01)
*B25H 3/00* (2006.01)

(52) U.S. Cl.
CPC .................................... *B25H 3/006* (2013.01)

(58) Field of Classification Search
USPC .......................................................... 248/645
See application file for complete search history.

(56) References Cited

U.S. PATENT DOCUMENTS 1,766,616 A * 6/1930 Faris ........................ A47B 3/00 108/132
2,869,769 A * 1/1959 Robinson ................. A45C 9/00 206/216
4,756,119 A * 7/1988 Chabot .................. A01G 9/108 108/127
4,920,950 A * 5/1990 Johnson .................. F24B 1/205 126/154
5,067,535 A * 11/1991 Wolff ................... B23D 47/025 144/1.1
5,078,353 A * 1/1992 Linn ...................... B25H 3/006 211/70.6
5,333,823 A * 8/1994 Joseph ..................... B44D 3/14 182/129
5,383,411 A * 1/1995 Tomaka ............... A47B 23/001 108/129
6,152,417 A * 11/2000 Randall ................ A47B 23/001 108/43
6,170,405 B1 * 1/2001 Weitzman ............. A47B 3/083 108/174
6,237,659 B1 * 5/2001 Francis .................. B25H 1/005 108/59
6,279,741 B1 * 8/2001 Arvin ..................... B25H 3/006 206/349
6,568,506 B1 * 5/2003 Donnalley ............. A47C 12/02 108/129
6,607,015 B1 * 8/2003 Chen ........................ B25H 1/04 108/132
6,662,838 B1 * 12/2003 Graham, III ........... B25H 1/005 108/147.2
6,719,250 B2 * 4/2004 FitzSimons ............. A47J 33/00 126/30
6,779,466 B2 * 8/2004 Shabram, Jr. ........ A47B 3/0912 108/115

(Continued)

*Primary Examiner* — Monica E Millner
(74) *Attorney, Agent, or Firm* — Maier & Maier, PLLC

(57) ABSTRACT

A retention device for hand-held power tools. The retention device may include a first plate which may be attached to the underside of the power tool; a second plate and a third plate which may be connected to the first plate via hinges. The second and third plates may have aligned notches fit for an object such as a piece of lumber. When the second and third plates are extended, the retention device may allow the power tool to be set down on the edge of the object in an upright position. When the second and third plates are folded, the power tool may still be placed in an upright position on a flat surface.

14 Claims, 4 Drawing Sheets

(56) References Cited

U.S. PATENT DOCUMENTS

| | | | | | |
|---|---|---|---|---|---|
| 6,786,162 | B1 * | 9/2004 | Volkmer | A47B 5/06 | 108/115 |
| 7,055,442 | B2 * | 6/2006 | Podd | A47B 23/001 | 108/25 |
| 7,628,186 | B2 * | 12/2009 | Blum | B25H 1/08 | 108/115 |
| 7,779,762 | B2 * | 8/2010 | Sackman | A47B 13/081 | 108/25 |
| 8,215,242 | B2 * | 7/2012 | Aguayo | A47B 23/00 | 108/43 |
| 8,376,307 | B2 * | 2/2013 | Frolov | B25H 1/04 | 108/118 |
| 8,875,840 | B2 * | 11/2014 | Chancler | A47C 9/10 | 182/33 |
| 2014/0374551 | A1 * | 12/2014 | Carter | A47B 3/002 | 248/188.5 |

* cited by examiner

RETENTION DEVICE FOR HAND-HELD POWER TOOLS

BACKGROUND

Nowadays, cordless hand-held power tools tend to be designed to be rested in an upright position on a flat surface, such as a workbench, floor, etc. This can make the tools easy to retrieve and may protect bits or other attachments from damage. However, if the user of a tool needs to stand up or work at a high position while using the power tools, there is a risk of the tool being dropped and damaged because there is generally no suitable place for the tool to be rested.

SUMMARY

Exemplary embodiments described herein generally relate to a retention device for hand-held power tools and, more specifically, to the retention device which helps the hand-held power tool to be set down on an edge of an object in a stable and upright position. The retention device can minimize the risk of the tool being dropped and damaged.

Such a retention device may include: a first plate being adhesively attachable to a hand-held power tool; a second plate connected to the first plate and having a first notch; a third plate connected to the first plate and having a second notch; a first hinge connecting the first plate and the second plate; and a second hinge connecting the first plate and the third plate. According to an exemplary embodiment, the second plate and the third plate are folded via the first hinge and the second hinge for the hand-held power tool to be placed in an upright position on a flat surface. Also, in an exemplary embodiment, the second plate and the third plate are extended via the first hinge and the second hinge for the hand-held power tool to be set down on an object in an upright position; and the first notch and the second notch may fit on an edge of the object.

BRIEF DESCRIPTION OF THE DRAWINGS

Advantages of embodiments of the present invention may be apparent from the following detailed description of the exemplary embodiments. The following detailed description should be considered in conjunction with the accompanying Figures in which:

Exemplary FIG. 1 may show a retention device for hand-held power tools where the side plates are extended;

Figure 2:
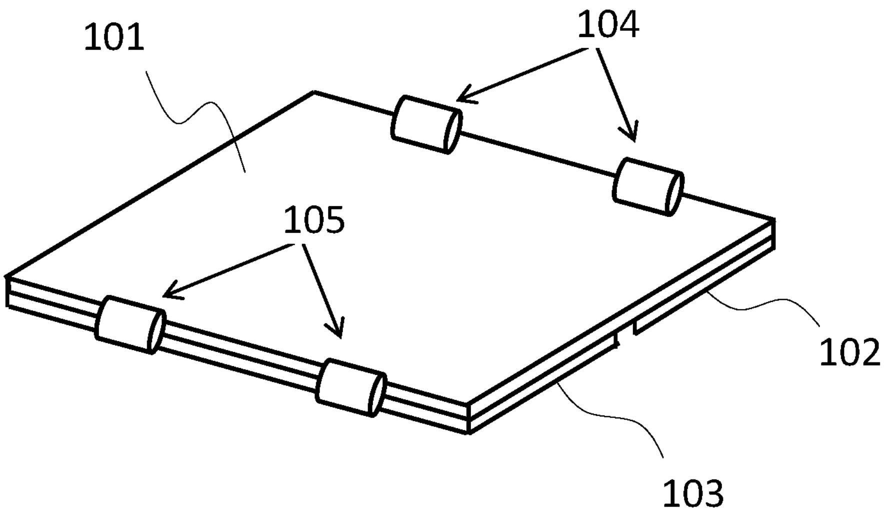
Figure 3:
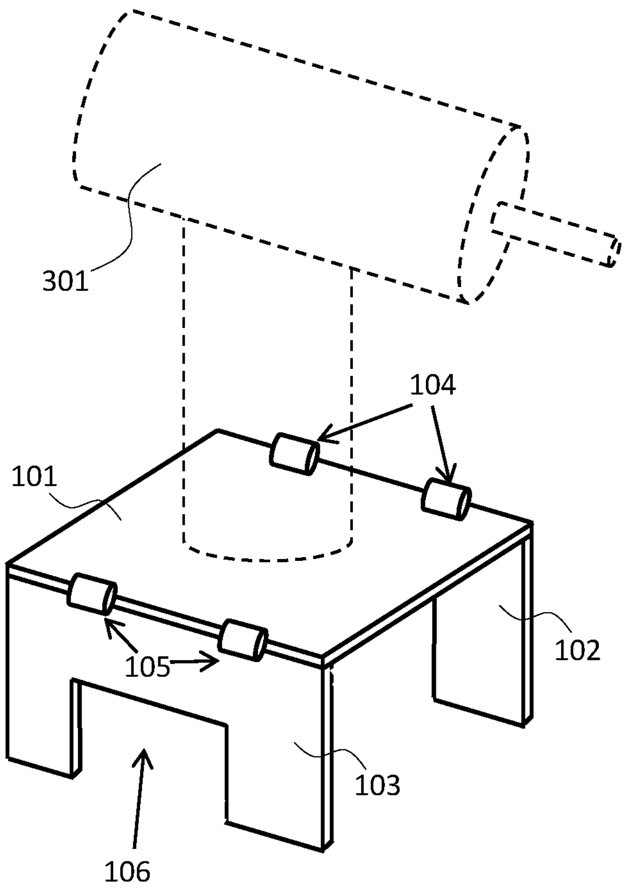
Figure 4:
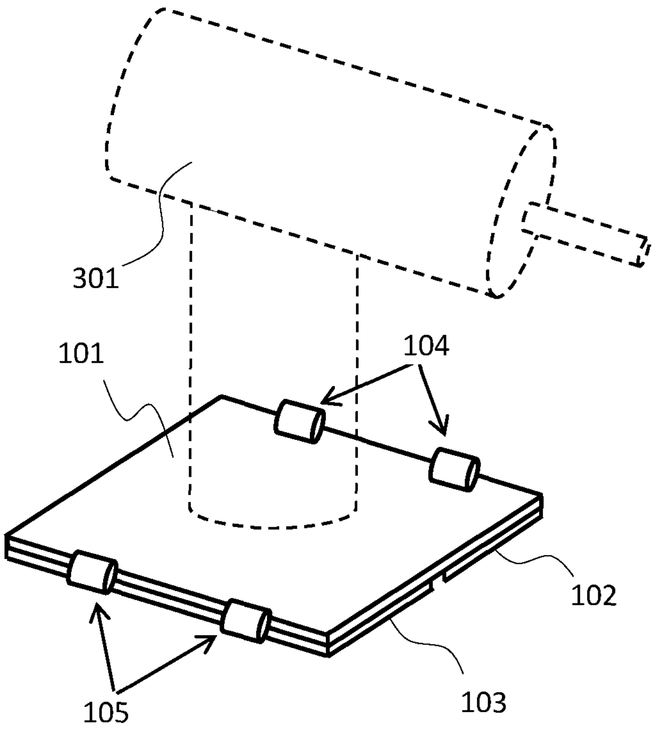
Figure 5:
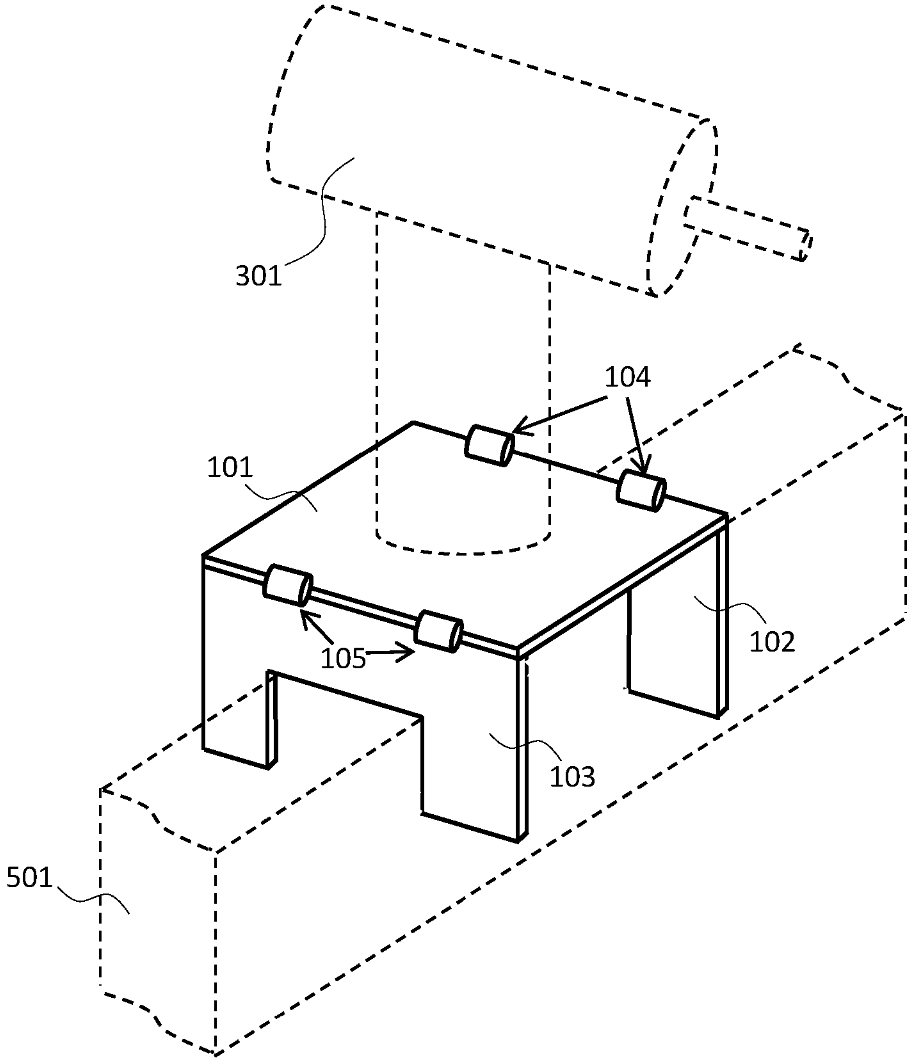

Exemplary FIG. 2 may show the retention device for hand-held power tools where the side plates are folded;

Exemplary FIG. 3 may show the retention device for hand-held power tools where the side plates are extended and an exemplary power is attached thereto;

Exemplary FIG. 4 may show the retention device for hand-held power tools where the side plates are folded and an exemplary power tool is attached thereto; and Exemplary FIG. 5 may show the retention device for hand-held power tools with exemplary environment.

DETAILED DESCRIPTION

Aspects of the present invention are disclosed in the following description and related Figures directed to specific embodiments of the invention. Those skilled in the art may recognize that alternate embodiments may be devised without departing from the spirit or the scope of the claims. Additionally, well-known elements of exemplary embodiments of the invention may not be described in detail or may be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Generally referring to the figures and specification, various exemplary embodiments of a retention device for hand-held power tools may be shown and described. Such a retention device is adhesively attachable to the underside of the power tool and permits the tool to be set down on the edge of an object such as a lumber in a stable and upright position. Thus, the retention device minimizes the risk of the tool being dropped and damaged.

Figure 1:
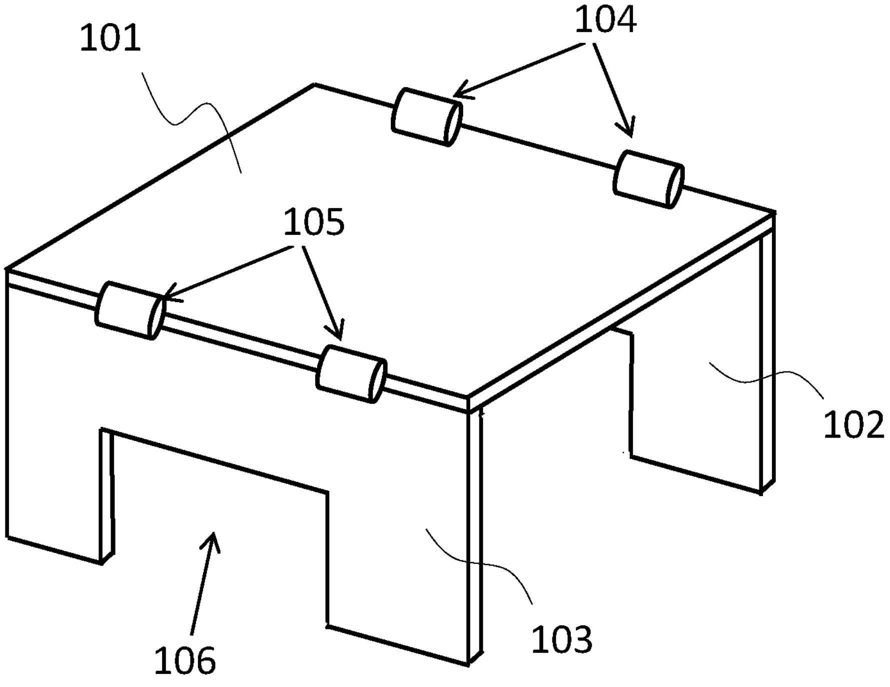

Turning now to exemplary FIG. 1, FIG. 1 shows a retention device for hand-held power tools where the side plates are extended. According to an exemplary embodiment, the retention device may include a first plate 101 which is to be adhesively attached to the hand-held power tool. For example, most power tools have a battery pack at the bottom part, and the first plate 101 may be bonded to the underside of the power tool's battery pack. Also, in an exemplary embodiment, the first plate 101 may be rectangular, for example, approximately 4 inches by approximately 3 inches, and the long edges of the first plate 101 may be pivotally attached to a pair of additional plates, a second plate 102 and a third plate 103. According to an exemplary embodiment, the second plate 102 may be connected to the first plate 101 via a first hinge 104, and the third plate 103 may be connected to the first plate 101 via a second hinge 105. The hinges (104 and 105) may include detents to hold the second and the third plates (102 and 103) in their fully extended and retracted positions. Other locking hinge mechanisms may be used, as would be understood by a person having ordinary skill in the art. In some exemplary embodiments, the hinge may have a release button to release the hinge from a locked orientation. In yet further embodiments, the hinge may be spring loaded, such that plates 102 and 103 may retract from an extended position to a folded position when the release button is pressed.

Referring still to FIG. 1, the second and third plates (102 and 103) may have notches 106 in their centers. According to an exemplary embodiment, the notches 106 may be similarly shaped and may be aligned, forming a track. Also, in an exemplary embodiment, the notches 106 may be sized to be large enough to fit on an edge of an object such as a piece of lumber, and the fit between the notches 106 and the object may be tight enough to support the hand-held power tool attached to the retention device in a stable and upright position on the edge of the object.

Turning now to exemplary FIG. 2, FIG. 2 shows the retention device for hand-held power tools where the side plates are folded. As described above, the second plate 102 may be connected to the first plate 101 via a first hinge 104, and the third plate 103 may be connected to the first plate 101 via a second hinge 105. According to an exemplary embodiment, the second and third plates (102 and 103) may be folded so that the power tool attached on the retention device may still be placed in an upright position on a flat surface in a conventional manner. Also, as mentioned above, by extending the second and third plates (102 and 103), a pair of aligned notches 106 may permit the retention device attached to the tool be set down on the edge of an object.

Turning now to exemplary FIG. 3, FIG. 3 shows the retention device for hand-held power tools where the side plates are extended and the power tool is attached to a top surface of the first plate. As described above, the first plate 101 of the retention device may be adhesively attached to the underside of the hand-held power tool 301 helping the tool 301 to be secured in a stable and an upright position on the edge of an object. Also, in another exemplary embodiment, even when the second and third plates (102 and 103) are extended, the retention device attached to the power tool 301 may still be placed in an upright position on a flat surface as desired.

Turning now to exemplary FIG. 4, FIG. 4 shows the retention device for hand-held power tools where the side plates are folded and the power tool 301 is attached to a top surface of the first plate. As described above, when the second and third plates (102 and 103) of the retention device are folded, the retention device attached to the power tool 301 may be placed in an upright position on a flat surface in a conventional manner.

Turning now to exemplary FIG. 5, FIG. 5 shows the retention device for hand-held power tools resting on the edge of an object, such as a piece of lumber. As described above, when the second and third plates (102 and 103) are extended, the pair of the notches 106 may fit on an edge of the object 501 supporting the hand-held power tool 301 securing the power tool in a stable and an upright position on the edge of the object 501. According to an exemplary embodiment, the object 501 may be a standard piece of inch and a half thick lumber, for example, a two by four, two by six, etc., such as lumber used for a floor joist, ceiling joist, etc, as would be understood by a person having ordinary skill in the art. In this manner, the retention device can permit the hand-held power tool 301 to be set down in a stable position under circumstances where there is no suitable place for the tool 301 to be rested. This may save time and effort, as well as minimize the risk of the tool 301 being dropped and damaged.

According to an exemplary embodiment, the first, second and third plates (101, 102 and 103) may be fabricated using injection-molded nylon, ABS (Acrylonitrile-Butadien-Styrene resin), or other suitable plastics as well as suitable metals strong enough to support the weight of the power tool 301 when resting on the edge of the object 501. Also, in an exemplary embodiment, the first and second hinges (104 and 105) may also be made of suitable plastic as well as metals strong enough to hold the second and third plate (102 and 103) in their fully extended or retracted positions.

The foregoing description and accompanying figures illustrate the principles, preferred embodiments, and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A retention device for hand-held power tools comprising:
- a first plate configured to attach to a hand-held power tool;
- a second plate connected to the first plate by a first hinge, the second plate having a first notch;
- a third plate connected to the first plate by a second hinge, the third plate having a second notch;
- wherein the second plate and the third plate are folded via the first hinge and the second hinge for the hand-held power tool to be fixed in an upright position on a flat surface of the first plate, and
- wherein the second plate and the third plate are extended via the first hinge and the second hinge by folding the first hinge to a position of 90 degrees such that the second plate is disposed in an orientation perpendicular to a plane of the first plate and folding the second hinge to a position of 90 degrees such that the third plate is disposed in the orientation perpendicular to the plane of the first plate for the hand-held power tool to be secured on an object in an upright position by the first notch and the second notch fitting over an edge of the object such that each of the first notch and the second notch rests on a top portion of the edge of the object.

2. The device of claim 1, wherein the first plate is bonded to an underside of the hand-held power tool.

3. The device of claim 1, wherein the first notch of the second plate and the second notch of the third plate are sized to fit to the edge of the object.

4. The device of claim 1, wherein the first hinge and the second hinge lock the second plate and the third plate when the second plate and the third plate are in fully extended positions.

5. The device of claim 1, wherein the first hinge and the second hinge include detents to lock the second plate and the third plate when the second plate and the third plate are in fully extended positions.

6. The device of claim 1, wherein the object is lumber.

7. The device of claim 1, wherein at least one of the first plate, the second plate and third plate is made of plastic.

8. The device of claim 1, wherein at least one of the first plate, the second plate and third plate is made of metal.

9. The device of claim 1, wherein the first hinge and the second hinge are made of metal.

10. The device of claim 1, wherein the first hinge and the second hinge are made of plastic.

11. The device of claim 1, wherein at least one of the first plate, the second plate and third plate is a rectangular plate.

12. The device of claim 11, wherein the second plate and the third plate are connected to long edges of the first plate.

13. The device of claim 1, wherein the second plate and the third plate are parallel.

14. The device of claim 1, wherein the first notch is disposed along a center part of an edge of the first plate and wherein the second notch is disposed along a center part of an edge of the second plate.

* * * * *